United States Patent
Coffin et al.

(10) Patent No.: US 10,380,027 B2
(45) Date of Patent: Aug. 13, 2019

(54) DISJOINTED VIRTUAL MEMORY SCHEME WITH BLOCK BYPASS

(71) Applicant: Friday Harbor LLC, New York, NY (US)

(72) Inventors: Jerome Vincent Coffin, San Diego, CA (US); Douglas A. Palmer, San Diego, CA (US)

(73) Assignee: Friday Harbor LLC, New York, NY (US)

( * ) Notice: Subject to any disclaimer, the term of this patent is extended or adjusted under 35 U.S.C. 154(b) by 346 days.

(21) Appl. No.: 15/280,015

(22) Filed: Sep. 29, 2016

(65) Prior Publication Data

US 2017/0192901 A1   Jul. 6, 2017

Related U.S. Application Data

(60) Provisional application No. 62/275,149, filed on Jan. 5, 2016.

(51) Int. Cl.
*G06F 12/00* (2006.01)
*G06F 12/10* (2016.01)
(Continued)

(52) U.S. Cl.
CPC ............ *G06F 12/10* (2013.01); *G06F 12/109* (2013.01); *G06F 12/1081* (2013.01); *H04L 45/566* (2013.01); *H04L 45/74* (2013.01); *H04L 47/627* (2013.01); *H04L 47/724* (2013.01); *H04L 47/726* (2013.01); *H04L 49/254* (2013.01); *H04L 49/3027* (2013.01); *H04L 49/70* (2013.01); *H04L 69/22* (2013.01);
(Continued)

(58) Field of Classification Search
None
See application file for complete search history.

(56) References Cited

U.S. PATENT DOCUMENTS 4,920,487 A   4/1990   Baffes
6,189,093 B1  2/2001   Ekner et al.
(Continued)

FOREIGN PATENT DOCUMENTS

GB           2457309            8/2009

OTHER PUBLICATIONS

International Search Report, dated Mar. 10, 2017, Applicant: Amazon Technologies, Inc., 25 pages.

(Continued)

*Primary Examiner* — Daniel D Tsui
(74) *Attorney, Agent, or Firm* — Sheppard Mullin Richter & Hampton LLP

(57) ABSTRACT

An improved virtual memory scheme designed for multiprocessor environments that uses processor registers and a small amount of dedicated logic to eliminate the overhead that is associated with the use of page tables. The virtual addressing provides a contiguous virtual address space where the actual real memory is distributed across multiple memories. Locally, within an individual memory, the virtual space may be composed of discontinuous "real" segments or "chunks" within the memory, allowing bad blocks of memory to be bypassed without alteration of the virtual addresses. The delays and additional bus traffic associated with translating from virtual to real addresses are substantially reduced or eliminated.

17 Claims, 12 Drawing Sheets

(51) Int. Cl.

| | |
|---|---|
| *H04L 12/863* | (2013.01) |
| *H04L 12/911* | (2013.01) |
| *H04L 29/06* | (2006.01) |
| *H04L 12/913* | (2013.01) |
| *H04L 12/937* | (2013.01) |
| *H04L 12/935* | (2013.01) |
| *H04L 12/931* | (2013.01) |
| *H04L 12/721* | (2013.01) |
| *H04L 12/741* | (2013.01) |
| *G06F 12/1081* | (2016.01) |
| *G06F 12/109* | (2016.01) |

(52) U.S. Cl.
CPC ............... *G06F 2212/1016* (2013.01); *G06F 2212/152* (2013.01); *G06F 2212/657* (2013.01)

(56) References Cited

U.S. PATENT DOCUMENTS

| | | | |
|---|---|---|---|
| 6,917,553 | B2 | 7/2005 | Mizugaki et al. |
| 7,006,536 | B1 | 2/2006 | Somashekhar |
| 7,221,678 | B1 | 5/2007 | Hughes |
| 7,729,239 | B1 | 6/2010 | Aronov |
| 8,219,778 | B2 | 7/2012 | Palladino et al. |
| 8,655,815 | B2 | 2/2014 | Palmer |
| 8,848,726 | B1 | 9/2014 | Palmer |
| 8,954,721 | B2 | 2/2015 | Amann et al. |
| 2002/0144078 | A1 | 10/2002 | Topham et al. |
| 2003/0229662 | A1 | 12/2003 | Luick |
| 2004/0196859 | A1 | 10/2004 | Benner |
| 2005/0068897 | A1 | 3/2005 | Arita |
| 2006/0165070 | A1 | 7/2006 | Hall |
| 2006/0294588 | A1 | 12/2006 | Lahann |
| 2007/0195761 | A1 | 8/2007 | Tatar |
| 2007/0220522 | A1 | 9/2007 | Coene |
| 2008/0263315 | A1 | 10/2008 | Zhang |
| 2008/0282232 | A1 | 11/2008 | Cong |
| 2009/0327647 | A1 | 12/2009 | Ingle et al. |
| 2010/0070714 | A1* | 3/2010 | Hoover ............... G06F 12/0842 711/128 |
| 2010/0228940 | A1* | 9/2010 | Asnaashari ......... G06F 12/0246 711/170 |
| 2011/0010483 | A1* | 1/2011 | Liljeberg ............ G06F 12/1441 711/6 |
| 2011/0191477 | A1 | 8/2011 | Zhang |
| 2011/0317691 | A1 | 12/2011 | Kajihara |
| 2012/0204181 | A1 | 8/2012 | Yachide |
| 2012/0327757 | A1 | 12/2012 | Wang |
| 2013/0024648 | A1 | 1/2013 | Chen et al. |
| 2013/0067484 | A1 | 3/2013 | Sonoda |
| 2013/0152099 | A1 | 6/2013 | Bass |
| 2013/0239111 | A1 | 9/2013 | Bingham |
| 2014/0032457 | A1 | 1/2014 | Palmer |
| 2014/0156907 | A1 | 6/2014 | Palmer |
| 2014/0204943 | A1 | 7/2014 | Palmer |
| 2014/0297846 | A1 | 10/2014 | Hoja |
| 2014/0359638 | A1 | 12/2014 | De Lima |
| 2015/0007185 | A1 | 1/2015 | Dey |
| 2015/0049758 | A1 | 2/2015 | Ancajas |
| 2016/0020993 | A1 | 1/2016 | Wu |
| 2016/0142341 | A1 | 5/2016 | Panchagnula |
| 2016/0224379 | A1 | 8/2016 | Palmer |
| 2016/0330127 | A1 | 11/2016 | Kim |
| 2017/0118033 | A1 | 4/2017 | Srinivasan |

OTHER PUBLICATIONS

Bensoussan, A., Clingen, C.T. and Daley, R.C., 1972. The Multics virtual memory: concepts and design. Communications of the ACM, 15(5), pp. 308-318. Retrieved Jun. 16, 2016.

Green, Paul. "Multics Virtual Memory—Tutorial and Reflections." Aug. 5, 2005. Retrieved Jun. 14, 2016.

Atmel Corporation, "High-Speed, Loadable 16-bit Binary Counter", Application Note, Field Programmable Gate Array, 1999, 5 pages.

Gupta, Pankaj, et al., "Routing Lookups in Hardware at Memory Access Speeds", IEEE INFOCOM '98, Proceedings of the Seventeenth Annual Joint Conference of the Computer and Communications Societies, vol. 3, IEEE 1998, pp. 1240-1247.

International Application No. PCT/US2016/015064, Notification Concerning Transmittal of International Preliminary Report on Patentability, dated Aug. 10, 2017, 8 pages.

International Search Report for International Application No. PCT/US2016/015064, dated May 6, 2016, 5 pages.

Sangireddy, Rama, et al., "Binary Decision Diagrams for Efficient Hardware Implementation of Fast IP Routing Lookups", Tenth International Conference on Computer Communication Networks, IEEE 2001, pp. 12-17.

Todri, Aida, et al., "Power Supply Noise Aware Workload Assignment for Multi-Core Systems", 2008, Proc. ICCAD, 2008, pp. 830-337.

Written Opinion for International Application No. PCT/US2016/015064, dated May 6, 2016, 11 pages.

Yang, Wen-Sheng, et al., "Hardware Based Routing Lookup for IPv4," ICS 2000, Workshop on Computer Networks, Internet, and Multimedia, Taiwan, 2000, pp. 223-230.

* cited by examiner

DISJOINTED VIRTUAL MEMORY SCHEME WITH BLOCK BYPASS

PRIORITY CLAIM

Priority is claimed from U.S. Provisional Patent Application 62/275,149 filed Jan. 5, 2016 and entitled "Lambda-Fabric: A Scale-Invariant Computing Interconnect Scheme," an entirety of which is incorporated herein by reference.

BACKGROUND

Multi-processor computer architectures capable of parallel computing operations were originally developed for supercomputers. Today, with modern microprocessors containing multiple processor "cores," the principles of parallel computing have become relevant to both on-chip and distributed computing environment.

BRIEF DESCRIPTION OF DRAWINGS

For a more complete understanding of the present disclosure, reference is now made to the following description taken in conjunction with the accompanying drawings.

DETAILED DESCRIPTION

Figure 1:
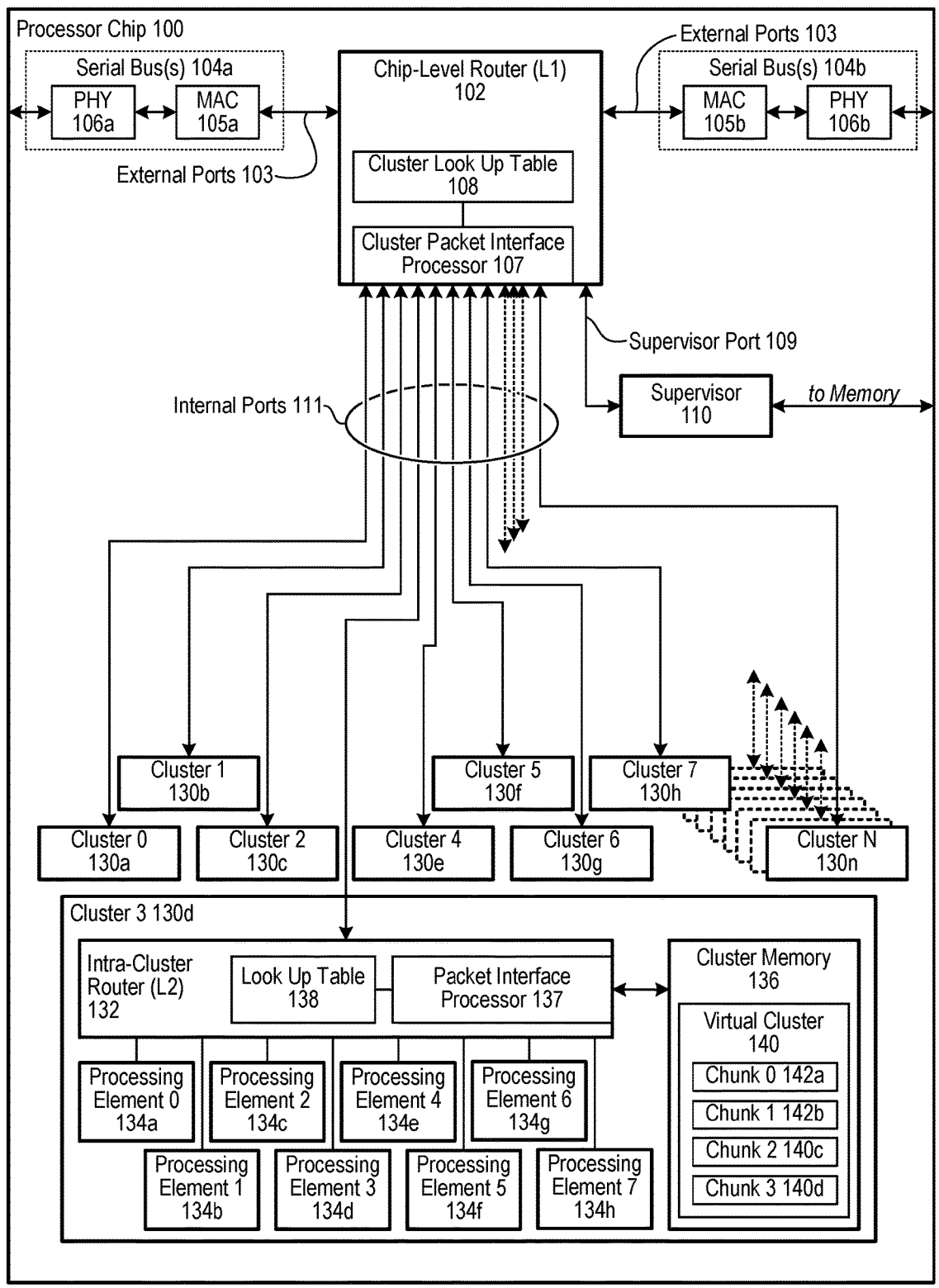
FIG. 1 is a block diagram conceptually illustrating an example of a network-on-a-chip architecture that utilizes localized address virtualization in a system that includes distributed memory.

In computing, "virtual" memory refers to a memory management technique that maps memory addresses used by a program, called virtual addresses, into physical addresses in computer memory. Storage as seen by a process or task appears as a contiguous address space or collection of contiguous segments. An operating system may manage virtual address spaces and the assignment of real memory to virtual memory. Address translation hardware in a processor, often referred to as a memory management unit or MMU, automatically translates virtual addresses to physical addresses. Software within the operating system may extend these capabilities to provide a virtual address space that can exceed the capacity of real memory and thus reference more memory than is physically present in the computer.

Conventional benefits of virtual memory include increased security due to memory isolation, and being able to conceptually use more memory than might be physically available using the technique of paging. Paging is a memory management scheme by which a computer stores and retrieves "pages" of data from secondary storage on an as-needed basis for use in main memory, where each page is a same-size block. Page tables store the mapping between the virtual address and physical addresses. As used herein, "real" and "physical" are used interchangeably.

Most earlier processors based their virtual addressing on lookup tables that map the entire virtual storage space. For example, in a typical scheme based on pages, a memory address is viewed as essentially two pieces: a page number and an offset into a page. As a typical example, the twelve least-significant bits of an address might represent an offset within a page, and the remaining more significant bits (typically at least twenty, and often more) represent a page number. This page number is used to look up a physical address in a page table, then the physical address and the offset within the page are used to read or write the actual memory.

Such a design is extremely flexible, but at a considerable cost in efficiency. The page tables occupy a considerable amount of memory—a conventional design might easily use several megabytes of memory just to hold the page tables. In addition, reading the page tables uses precious memory bandwidth. To minimize the memory bandwidth used to read page tables, most conventional processors cache at least a small part of the paging table on the processor.

Disclosed herein is an improved virtual memory scheme designed for multi-processor environments that uses processor registers and a small amount of dedicated logic to eliminate the overhead that is associated with the use of page tables. The virtual addressing provides a contiguous virtual address space where the actual real memory is distributed across multiple memories. Locally, within an individual memory, the virtual space may be composed of discontinuous "real" segments or "chunks" within the memory. The delays and additional bus traffic associated with translating from virtual to real addresses are eliminated.

The improved virtual address scheme uses packets to route data within semiconductor chips and externally between chips. Processors have increased in complexity and scope to the point that they can benefit from a routed packet network on a semiconductor chip including multiple processors. By using a same packet format on-chip as well as off-chip, a seamless fabric is created for high data throughput computation that does not require data to be re-packed and re-transmitted between devices.

In addition to any "main" memory that is shared by all of the processors, smaller memories may be distributed across each chip, where clusters of processors share a local memory amongst themselves. The virtual addressing scheme can provide a contiguous set of virtual addresses for a system where the actual memories are not only distributed across different chips in a system, but are distributed between memories within each chip, and distributed across multiple segments within an individual memory. Among other advantages, this allows memory to rapidly be remapped to remove bad blocks of memory from the virtual addressing space.

A "host" process executed by one or more processing elements in the system can remap virtual addresses to different physical blocks, and add and drop blocks from the virtual address space on an as-needed basis. When devices are added or dropped from the system, a host process can remap the virtual address space to accommodate the change in the physical space. Moreover, by monitoring traffic within the system, the host process can remap the virtual address space as a load balancing tool, changing the physical location of a virtual block to be closer to the processing elements accessing that portion of the virtual address space. This flexibility reduces latency and optimizes resource use.

Conventional systems that use virtual addressing typically operate in a virtual addressing mode or in a physical addressing mode, but are not able to contemporaneously handle both addressing types. Such systems reconfigure themselves to switch between addressing modes, creating computational delay and reducing flexibility. In comparison, the improved architecture allows contemporaneously mixed physical and virtual addressing. Whether a packet uses physical addressing or virtual addressing is determined on a packet-to-packet basis, with the address type used by each packet being independent of the address type used by every other packet in the system. Eliminating "modal" operation improves operational efficiency and simplifies simultaneous execution of processes with different memory needs.

FIG. 1 illustrates such an architecture. The multi-core chip 100 includes a top level (L1) router 102 that moves data inside the chip and between chips. All data packets begin with a header containing routing data. Routing to internal parts of the chip may be done by fixed addressing rules. Routing to external ports may be done by comparing the packet header against a set of programmable tables and registers. The same hardware can route internal to internal (loopback), internal to external (outbound), external to internal (inbound) and external to external (pass through). The routing framework may support a wide variety of geometries of chip connections, and allows execution-time optimization of the fabric to adapt to changing data flows.

The L1 router 102 is connected to one or more external-facing ports 103 that connect the chip 100 to other chips, devices, components, and networks. Such external-facing ports 103 may provide access to one or more external communication channels via external serial data busses 104a and 104b. Each serial bus 104 comprises at least one media access control (MAC) port 105a, 105b and a physical layer hardware transceiver 106a, 106b. The L1 router 102 may also be connected to a chip-level supervisor processor 110 and/or data feeder, such as a processor/feeder that distributes executable instructions to configure the programmable elements of the router 102 and otherwise manage overall operations on the chip.

Each chip has a device identifier ("device ID") that uniquely identifies within the system. Device IDs may be physical or virtualized. An example of a physical device ID is a burned-in identifier stored in hardware or firmware (such as a MAC address or serial number) when the chip is manufactured. An example of a virtualized device ID is a unique identifier assigned to a device/chip by a host process when the system is initialized and when a new chip/device is added to an existing network topology. When data packets arrive in the L1 router 102, the L1 router examines the header at the front of each packet to determine the destination of the packet's data payload. Each packet header identifies a destination chip by including that chip's device ID in an address contained in the packet header. Packets that are received by the L1 router that have a device ID matching that of the chip 100 containing the L1 router 102 are routed within the chip using a fixed pipeline through a supervisor port 109 to the supervisor 110 or through one of the internal ports 111 linked to a cluster 130 of processor cores 134 within the chip. The L1 router 102 routes packets that are received with a non-matching device ID through an external port 103.

The same set of device IDs may be used for both physical and virtual addressing. As such, if the host process assigns a device ID to each chip in the system (i.e., a virtualized device ID), both physical and virtual addressing will use the host-assigned device IDs to indicate a packet's destination. Likewise, if the system is configured to use hardware-or-firmware-specified device IDs (such as a MAC address or serial number), both physical and virtual addressing will use each device's burned-in device ID to indicate a packet's destination.

The L1 router 102 includes a set of registers 108 that stores a cluster lookup table, and a cluster packet interface processor (CPIP) 107. When the L1 router receives a packet to be routed to a destination on the chip 100, the CPIP 107 determines from the packet header whether virtual addressing is being used. If virtual addressing is being used, the CPIP 107 translates the bits identifying the virtual cluster to determine the actual physical cluster 130, and causes the L1 router 102 to direct the packet through the internal port 111 corresponding to the actual physical cluster 130.

Packets destined for a processing element 134 or a cluster memory 136 within the chip 100 may be routed by the L1 router 102 directly to the actual cluster 130, or routed through intermediate routers (not illustrated) that include their own CPIPs 107. Whether there are or are not additional routing tiers between the L1 router 102 and the clusters 130 is a design choice.

As illustrated, there are clusters 130a to 130n, where "n" is not intended to convey any particular upper limit. For example, there might be thirty-two (32) clusters 130. Each cluster 130 comprises a plurality of processing elements 134 and a cluster memory 136. As illustrated, each cluster 130 includes eight (8) processing elements 134a-h (e.g., processor cores). Thus, in this example, the L1 router 102 services two-hundred-fifty-six (256) processing elements within the chip 100, associated with thirty-two (32) cluster memories 136.

Each cluster 130 includes an intra-cluster router (L2) 132 which routes transactions between each processing elements 134 in the cluster 130, between processing elements 134 within the cluster 130 and the cluster memory 136, and between a processing element 134 or cluster memory 136 and the L1 router 102 (directly or via intervening routers).

Each L2 router 132 includes a set of registers 138 that store another lookup table, and a packet interface processor (PIP) 137. When the L2 router 132 receives a packet to be routed to the cluster memory 136, the PIP 137 determines from the packet header whether virtual addressing is being used. If virtual addressing is being used, with the virtual address specifying a virtual block within a virtual cluster 140, the PIP 137 replaces higher-order in an "offset" of the virtual address with bits that identify a physical block within the cluster memory 136.

The virtual cluster 140 corresponds to one or more "chunks" 142 of memory addresses within the cluster memory 136, where each chunk 142 includes at least one block. Typically, each chunk 142 would include an integer number of blocks. The size of a "block" is uniform throughout the system. While the range of virtual addresses corresponding to a virtual cluster 140 are contiguous, the actual chunks 142 that make up the virtual cluster may have different sizes, with gaps in the physical addresses between chunks.

Rather than using an arbitrary translation from each page number to a physical address, the combination of the CPIP 107 and PIP 137 provide a uniform translation to addresses in all the clusters of a device. The translation tables 108 and 138 provide linear translation from the virtual space directly to physical memory location, with only two registers (one in each of 108 and 138) being used per translation.

Figure 2:
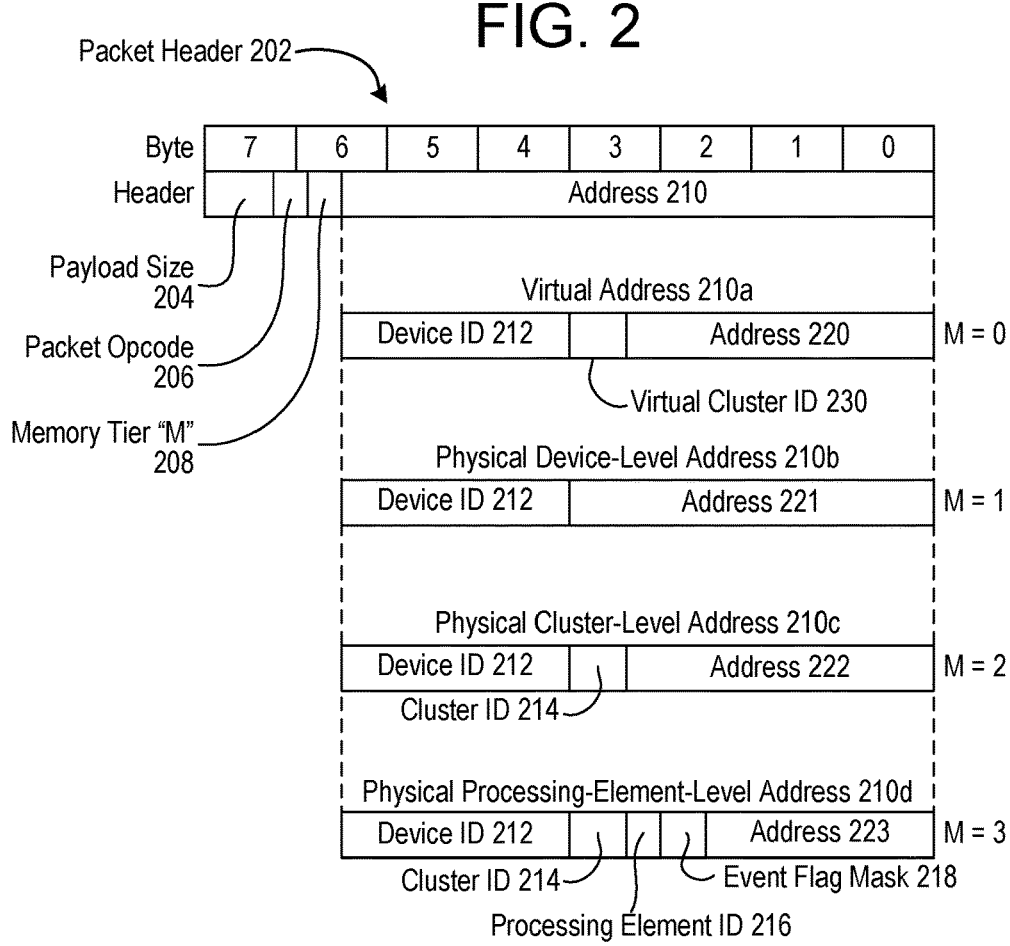
FIG. 2 illustrates an example of a packet header used by the system.

As illustrated in FIG. 2, a packet header 202 may include a global address, where the address space accommodates locations internal and external to a chip 100. A payload size 204 may indicate a size of the payload associated with the header 202. If no payload is included, the payload size 204 may be zero. A packet opcode 206 may indicate the type of transaction conveyed by the packet, such as indicating a write instruction or a read instruction. A memory tier "M" 208 may indicate what tier of device memory is being addressed, such as main memory (connected to supervisor 110), cluster memory 136, or a program memory or registers within a processing element 134. As illustrated, the memory tier "M" 208 also indicates whether virtual or physical addressing is being used. As an alternative, a separate "V" bit may be included in the header that indicates whether addressing is real or virtual.

Figure 3A:
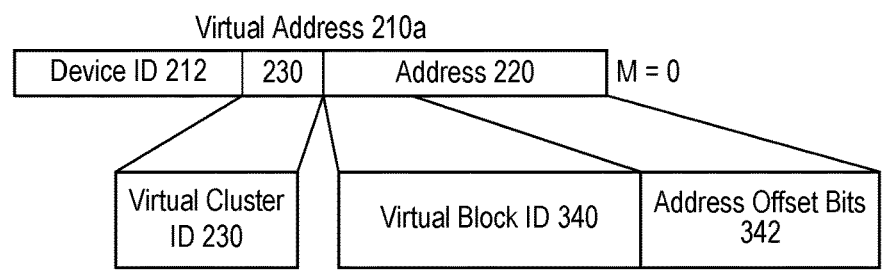
FIG. 3A illustrates an example structure of a virtual address used by the system.

The structure of the address 210 in the packet header 202 may vary based on the tier of memory being addressed, and whether addressing is virtual or physical. For example, a memory tier "M" value of zero may be used to indicate that the address 210 is a virtual address 210a. As illustrated in FIG. 3A, each virtual address 210a includes a device ID 212, first virtual address bits 230 (a virtual cluster ID 230), and an address field 220. The virtual cluster ID 230 indicates a virtual cluster 140. The address field 220 includes second virtual address bits 340 (upper bits 340) that identify a virtual block (i.e., a virtual block ID) and address offset bits 342 (lower bits 342) corresponding to an address offset within the block. The number of bits used for the address offset bits 342 corresponds to the number of bits per block.

As for physical address, at a top physical tier (e.g., M=1), a physical device-level address 210b may include a unique device identifier 212 identifying the processor chip 100 and an address field 221 corresponding to a location anywhere in the physical address space, such as in a main-memory.

Figure 3B:
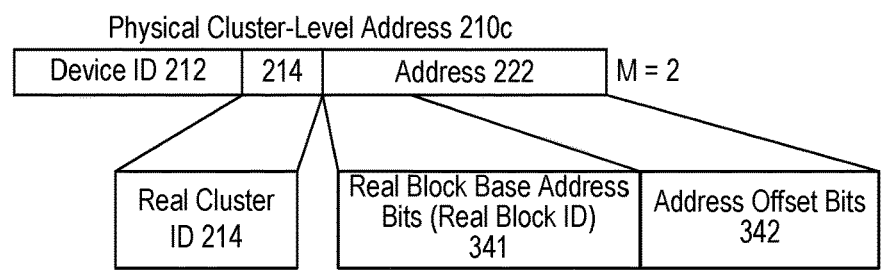
FIG. 3B illustrates an example structure of a physical address used by the system.

At a next physical tier (e.g., M=2), a cluster-level address 210c may include the device identifier 212, a cluster identifier 214 (identifying a cluster 130), and an address field 222 corresponding to a location in the cluster memory 136. As illustrated in FIG. 3B, although the address field 222 specifies a physical memory location within a cluster memory 136, it can be subdivided into real (physical) base address bits 341 (i.e., a real block ID) and address offset bits 342 identifying a location within the block. The offset bits 342 in the real address field 222 are the same as those in the virtual address field 220, since it is the blocks that are virtualized, rather than the location within the blocks.

At the processing element level (e.g., M=3), a processing-element-level address 210d may include the device identifier 212, the cluster identifier 214, a processing element identifier 216, an event flag mask 218, and an address 223 of the specific location in the processing element's operand registers, program memory, etc.

The event flag mask 218 may be used by a packet to set an "event" flag upon arrival at its destination. Special purpose registers within the execution registers of each processing element may include one or more event flag registers, which may be used to indicate when specific data transactions have occurred. So, for example, a packet header designating an operand register of a processing element 134 may indicate to set an event flag upon arrival at the destination processing element. A single event flag bit may be associated with all the registers, with a group of registers, or a single register. Each processing element 134 may have multiple event flag bits that may be altered in such a manner. Which flag is triggered may be configured by software, with the arriving packet designating the flag to be triggered. A packet may also write to an operand register without setting an event flag, if the packet event flag mask 218 does not indicate to change an event flag bit.

As noted above, the system can be configured to use real or virtualized the device IDs 212, with the same device IDs are used for both virtual and physical addresses. The device ID 212 may be factory-coded into the chip 100, and/or assigned when a chip or device first joins the system comprising a network of chips/devices. One or more processing elements 134 (or other processors, such as a supervisor 110) within the system may be configured as a host that, among other things, executes the host process that manages the assigning of unique device IDs 212 when a device/chip joins the system, and/or determining the device/chip's physical ID. When a device/chip is removed from the system, the host may reassign the departing chip's device ID. Each chip/device may also have an assigned MAC address that serves as a physical ID, which may also be used for addressing. However, an advantage of virtualizing the device IDs 212 is that fewer bits of the address 210 are required to route packets within the system. With slightly added complexity, the system can be configured to support contemporaneous use of both burned-in and assigned device IDs. Among other ways this could be accomplished would be to add more memory tiers (208), with some tiers associated with virtualized (host-assigned) device IDs and some associated with physical (e.g., burned-in at time of manufacture) device IDs.

Figure 4:
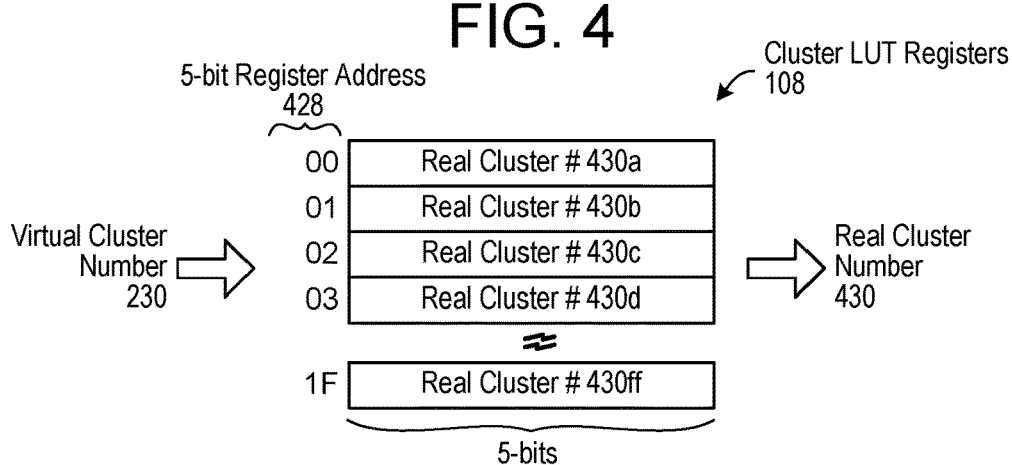
FIG. 4 illustrates an example of chip-level registers storing a look-up table used to translate between virtual cluster numbers and real cluster numbers.

FIG. 4 illustrates an example of the cluster look-up table registers 108. On a chip 100 with thirty-two (32) clusters, there are thirty-two (32) individual registers 108. Each register stores first physical address bits 430 corresponding to the identifier of a real cluster 130. There is a one-to-one mapping between the virtual cluster number bits 230 in the virtual address 210a and the first physical address bits 430 (real cluster number bits 430). So, for example, if there are thirty-two virtual clusters 140, then there are five (5) virtual cluster number bits 230. The virtual cluster number bits 230 correspond to a register address 428, such that each virtual cluster number 230 results in a five-bit output corresponding to the real cluster number 430. The first physical address bits 430 (real cluster number bits 430) may be a portion of a memory address, or may correspond to a portion of a memory address.

Figure 5:
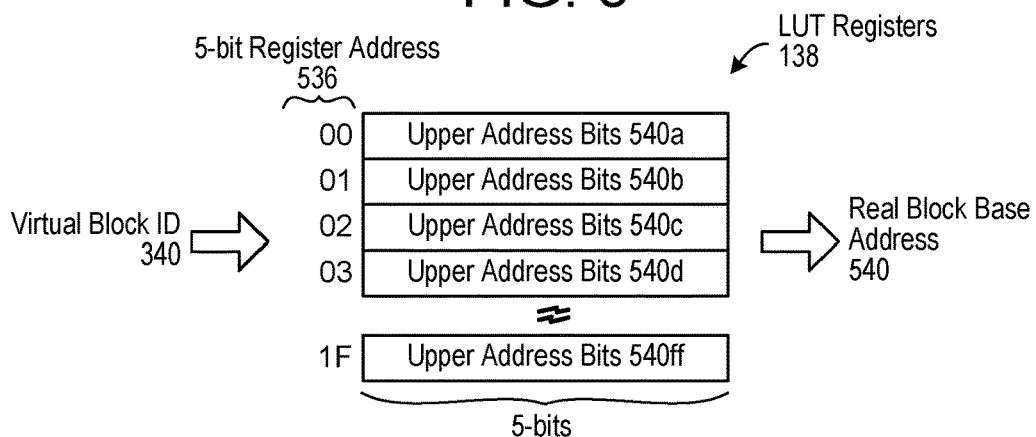
FIG. 5 illustrates an example of cluster-level registers used to locally translate address bits corresponding to a virtualized memory block into address bits indicating a real memory block.

FIG. 5 illustrates an example of the block ID look-up table registers 138, as used by the L2 routers 132. The registers 138 are also configured to provide a one-to-one mapping. If each virtual cluster 140 contains (for example) thirty-two (32) blocks, there are thirty-two (32) individual registers 138. Each register stores second physical address bits 540 corresponding to a real block base address identifying a block of physical memory with a cluster memory 136. There is a one-to-one mapping between the virtual block ID bits 340 in the virtual address 210a and the second physical address bits 540 (real block base address bits 540). So, for example, if there are thirty-two (32) virtual blocks within a virtual cluster 140, then there are five (5) bits 340 to identify the virtual block. The virtual block ID bits 340 correspond to a register address 536, such that each virtual block ID 340 results in a five-bit output corresponding to the base address bits of a physical block.

Figure 6:
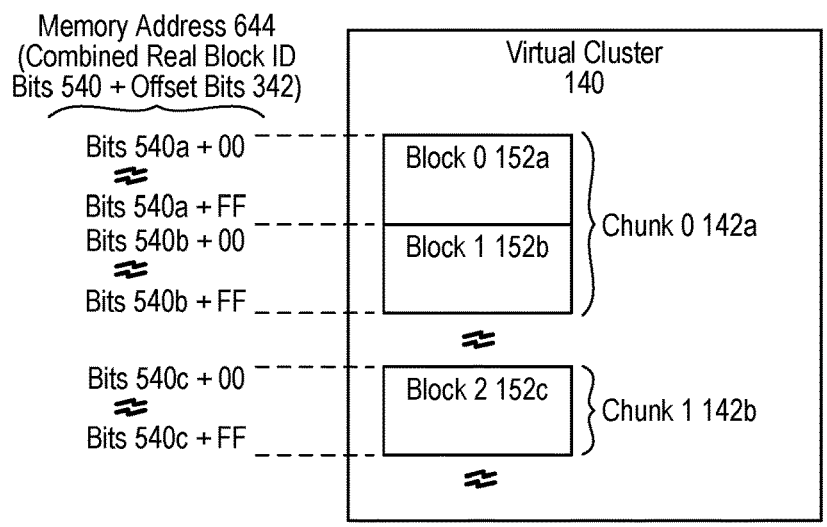
FIG. 6 illustrates how chunks of local memory may be divided into multiple blocks.

FIG. 6 illustrates how blocks 152 of local memory may be divided among multiple chunks 142. While a single contiguous chunk of a cluster memory 136 might initially be used for an entirety of the blocks within a virtual cluster, as bad bits are detected, blocks may be taken out of service, re-dividing the blocks across multiple chunks. Bad blocks may be detected during processing operations based, for example, on parity bit inconsistency, through the use of longitudinal redundancy checks, etc. As illustrated in FIG. 6, the virtual cluster 140 is divided across multiple discontinuous clusters (e.g., 142a, 142b, etc.). Each chunk 142 includes at least a block 152, but different chunks may have different sizes. For example, chunk 142a includes blocks 152a and 152b, whereas chunk 142b includes only block 152c. The blocks 152 within a virtual cluster 140 are addressed within cluster memory 136 by concatenating the real block base address bits 540 from the LUT register 138 with the address offset bits 342 of a virtual address 210a.

The addressing scheme used with a return address specified in a packet payload is independent of the addressing scheme used in the packet header. So, for example, if a packet header 202 includes a virtual address 210a and indicates (e.g., by packet opcode 206) that the packet is a read packet, a payload of the packet may indicate a real or virtual address to which the read data should be returned. Likewise, a packet using a physical destination address (210b-d) in the header 202 may have a payload indicating a real or virtual return address.

Figure 7:
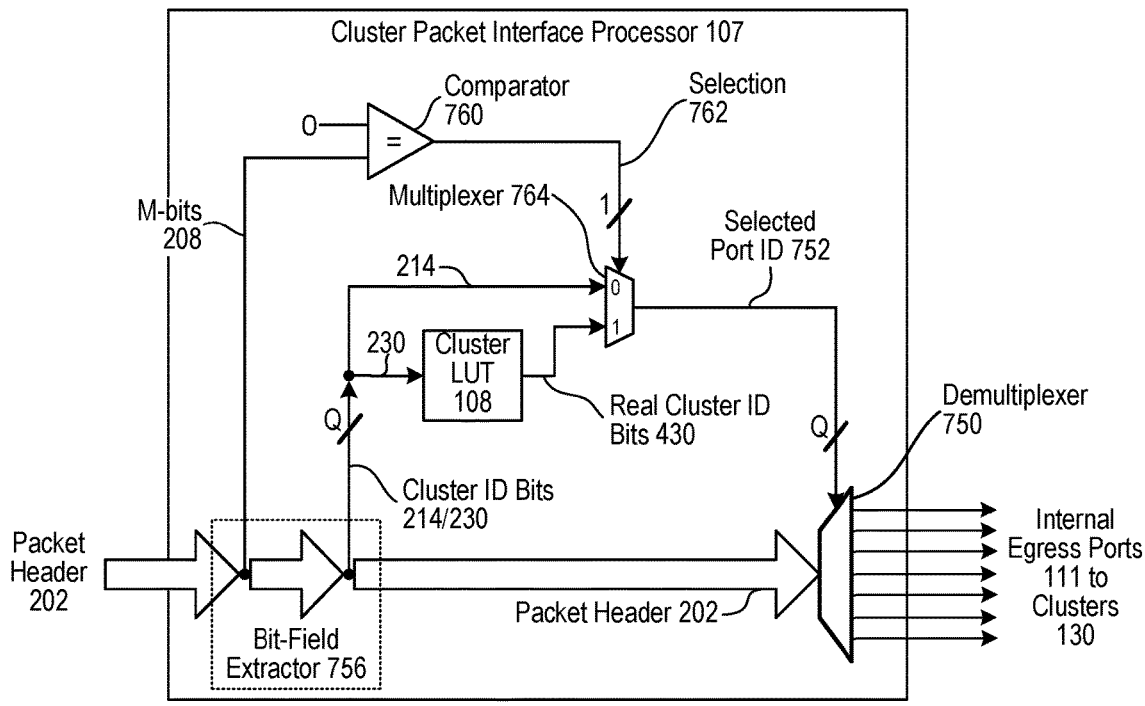
FIG. 7 illustrates example components within a chip-level packet interface processor that use the registers storing a lookup table like that in FIG. 4 to direct a packet to the real cluster.

FIG. 7 illustrates example components within a chip-level packet interface processor 107 that use the registers 108 storing a lookup table like that in FIG. 4 to direct a packet to the real cluster. A bit-field extractor 756 non-destructively extracts the M-bits 208 and the cluster ID bits 214/230 from each packet being routed by the L1 router 102 to an internal port 111 within the chip 100. The M-bits 208 are checked by a digital comparator 760 to determine whether they equal zero, indicating that the packet is using virtual addressing. If the M-bits indicate that the packet header 202 uses virtual addressing, the comparator 760 asserts a selection signal 762. The cluster number bits 214/230 are input into a first input of a multiplexer 764, and are also used as to address the cluster look-up table registers 108. If the cluster ID bits are virtual, the output of the register 108 will be the real cluster number bits 430. The output from the register is input into a second input of the multiplexer 764.

When the selection signal 762 is not asserted, the multiplexer 764 selects and outputs the cluster number bits 214 as received in the packet header 202. When the selection signal 762 is asserted, the multiplexer 764 selects and outputs the real cluster number bits 430. The output from the multiplexer 764 serves as a selected internal port identifier 752. The selected port ID (consisting of "Q" bits) is input into the selection input of a demultiplexer 750. In accordance with the selected port ID 752, the demultiplexer 750 directs the packet to the cluster 130. Using fast memory for the CLUT registers 108 (e.g., static random access memory (SRAM)), the operations of the CPIP 107 can be performed in a fraction of a clock cycle (i.e., less than one cycle of the clock signal that is used to control timing within the L1 router 102).

Figure 8:
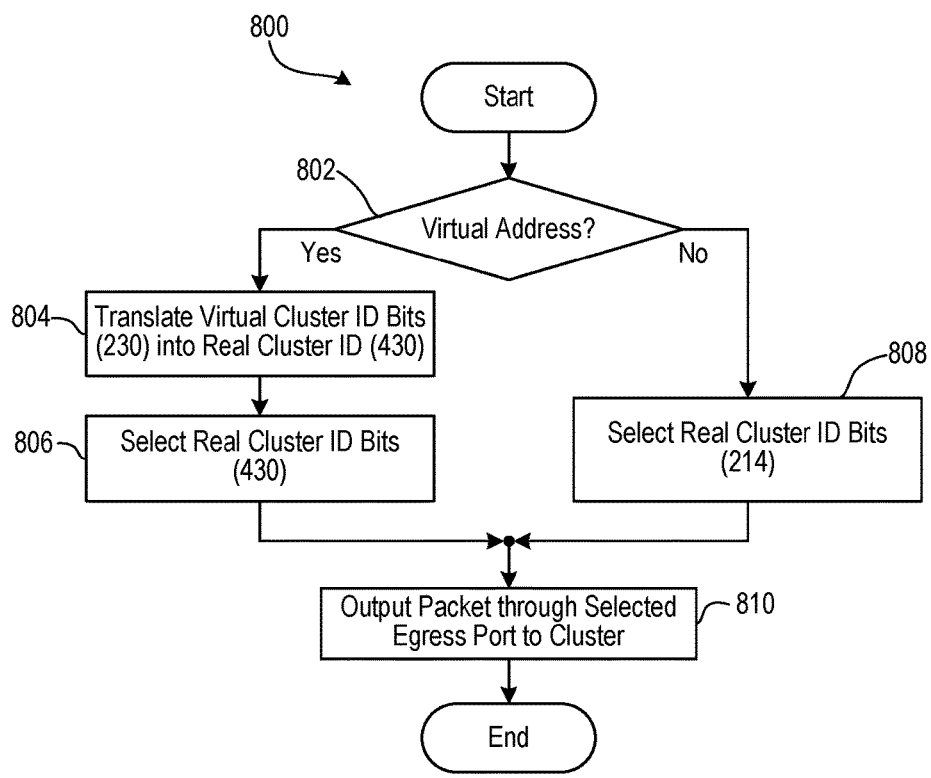
FIG. 8 illustrates an example of the process performed by the chip-level packet interface processor.

FIG. 8 illustrates an example of a process 800 performed by a chip-level packet interface processor 107. The PIP 107 determines 802 whether virtual addressing is being used. If virtual addressing is used (802 "Yes"), the PIP 107 translates (804) the virtual cluster ID bits 230 into real cluster ID bits 430 and selects (806) the translated real cluster number bits 430. If virtual addressing is not used (802 "No"), the PIP 107 selects the real cluster bits 214, as extracted from the packet header 202. The L1 router 102 outputs the packet through the internal egress port selected by the PIP 107 to the cluster 130 corresponding to the selected cluster ID bits 213/430.

Figure 9:
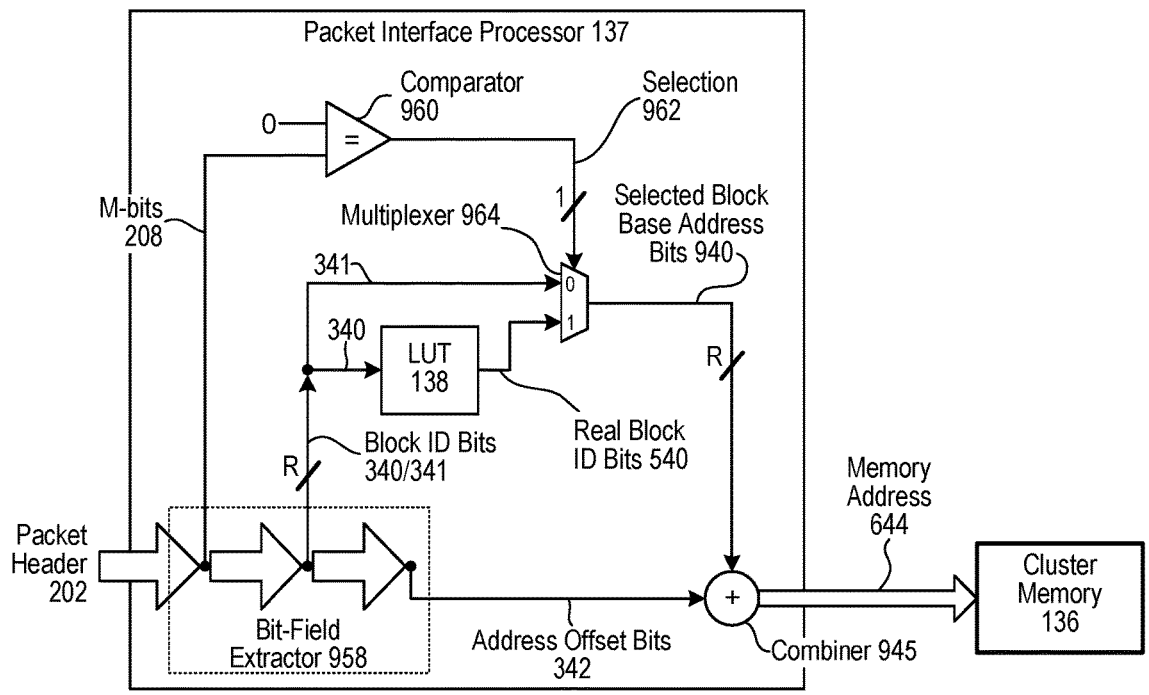
FIG. 9 illustrates example components within a cluster-level packet interface processor that use the registers storing a lookup table like that in FIG. 5 to address memory.

FIG. 9 illustrates example components within a cluster-level packet interface processor 137 that use the registers 138 storing a lookup table like that in FIG. 5 to address the cluster memory 136. A bit-field extractor 958 extracts the M-Bits 208, the block ID bits 340/341, and the address offset bits 342 from a packet header received by an L2 router 132. The M-bits 208 are checked by a digital comparator 960 to determine whether they equal zero, indicating that the packet is using virtual addressing. If the M-bits indicate that the packet header 202 uses virtual addressing, the comparator 960 asserts a selection signal 962. The block ID bits 340/341 are input into a first input of a multiplexer 964, and are also used as to address the look-up table registers 138. If the block ID bits are virtual, the output of the register 138 will be the real cluster number bits 540. The output from the register 138 is input into a second input of the multiplexer 964.

When the selection signal 962 is not asserted, the multiplexer 964 outputs the real block ID bits 341 as received in the packet header 202. When the selection signal 962 is asserted, the multiplexer 964 selects outputs the real block ID bits 540. The output from the multiplexer 964 serves as the base address 940 of the selected block. The base address 940 (consisting of "R" bits) is concatenated with the extracted address offset bits 342 by a combiner 945, producing a physical cluster memory address 644. Using fast memory for the LUT registers 138 (e.g., static random access memory (SRAM), the operations of the PIP 137 can be performed in a fraction of a clock cycle.

Figure 10:
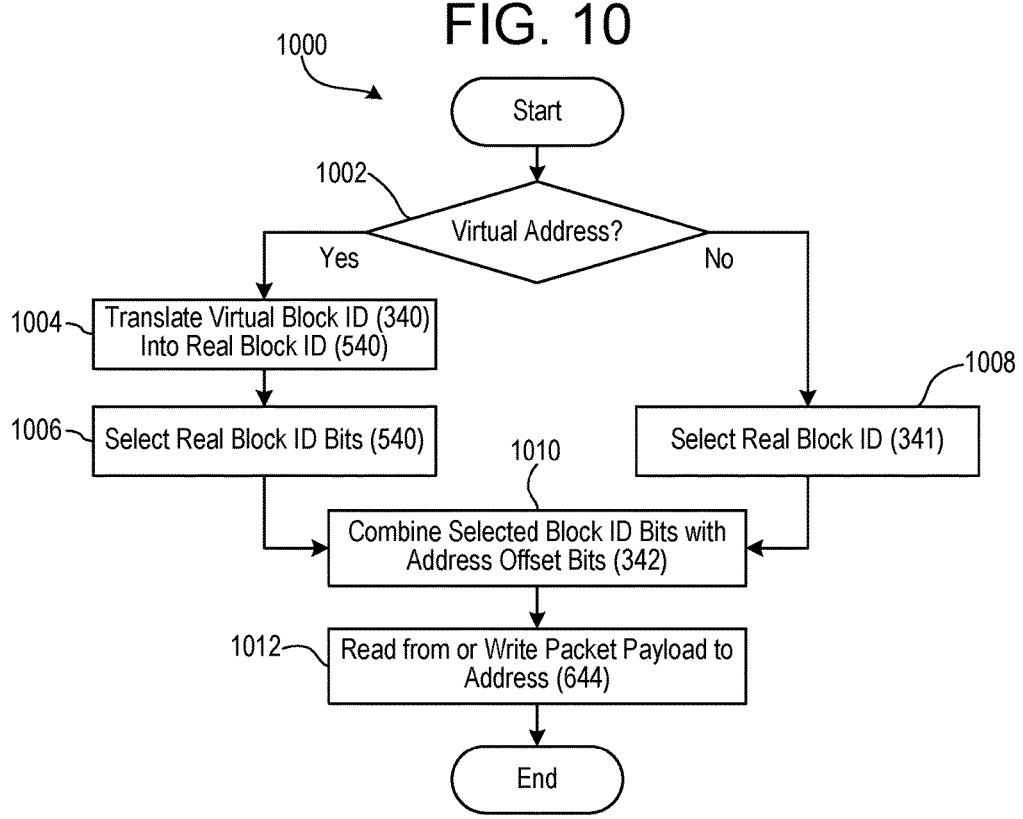
FIG. 10 illustrates an example of the process performed by the cluster-level packet interface processor.

FIG. 10 illustrates an example of the process 1000 performed by the cluster-level packet interface processor 137. The PIP 137 determines 1002 whether virtual addressing is being used. If virtual addressing is used (1002 "Yes"), the PIP 137 translates (1004) the virtual block ID bits 340 into real block ID bits 540 and selects (1006) the translated real block ID bits 540. If virtual addressing is not used (1002 "No"), the PIP 137 selects the real block ID bits 341, as extracted from the packet header 202. The PIP 137 combines (1010) the selected real block ID (540/341) with the extracted address offset bits 342 to form the memory address 644. Data is then read from or written to the memory address 644 in the cluster memory 136, as specified by the packet.

Figure 11A:
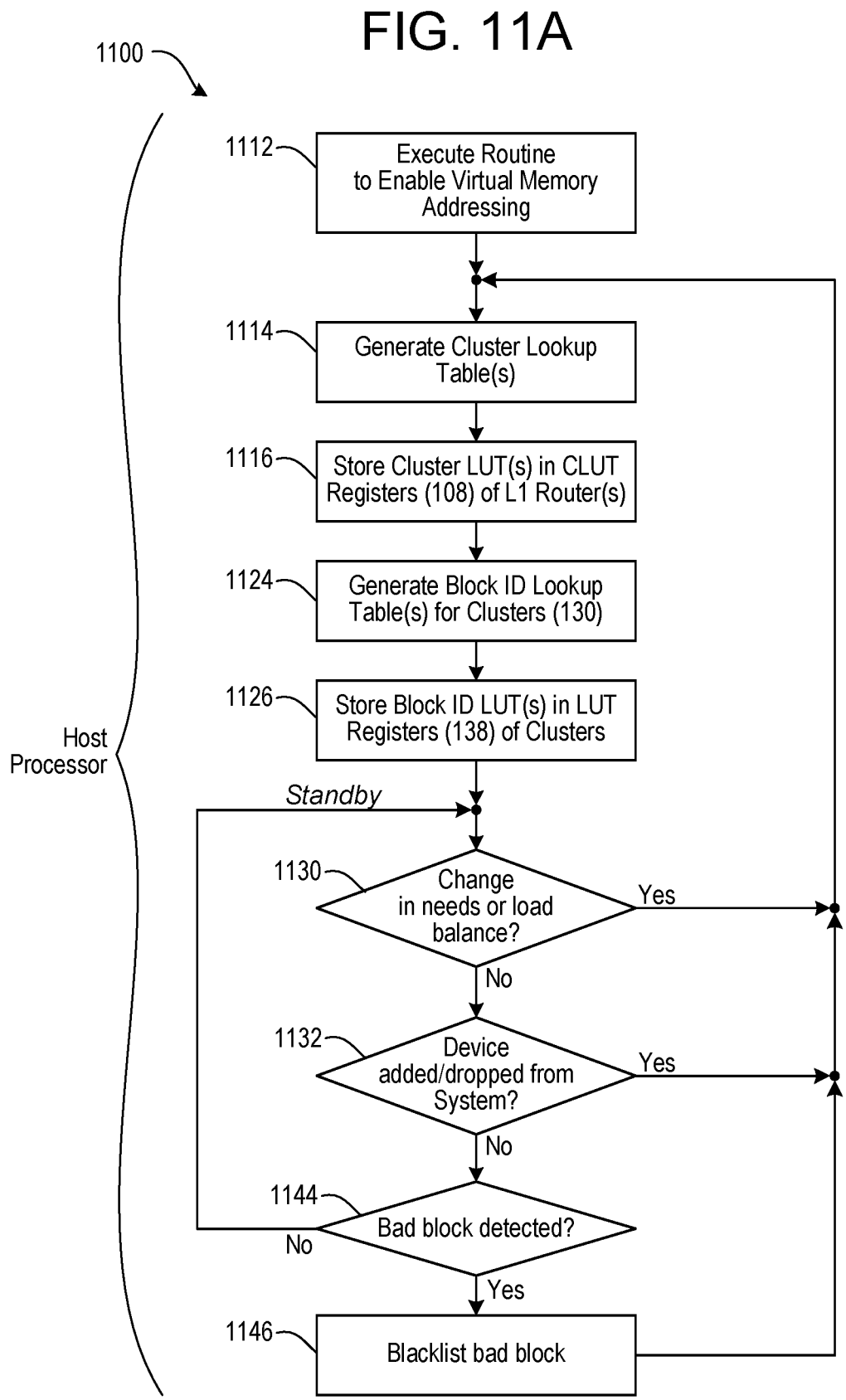
FIGS. 11A and 11B illustrate examples of processes used to generate and store the lookup tables.
Figure 11B:
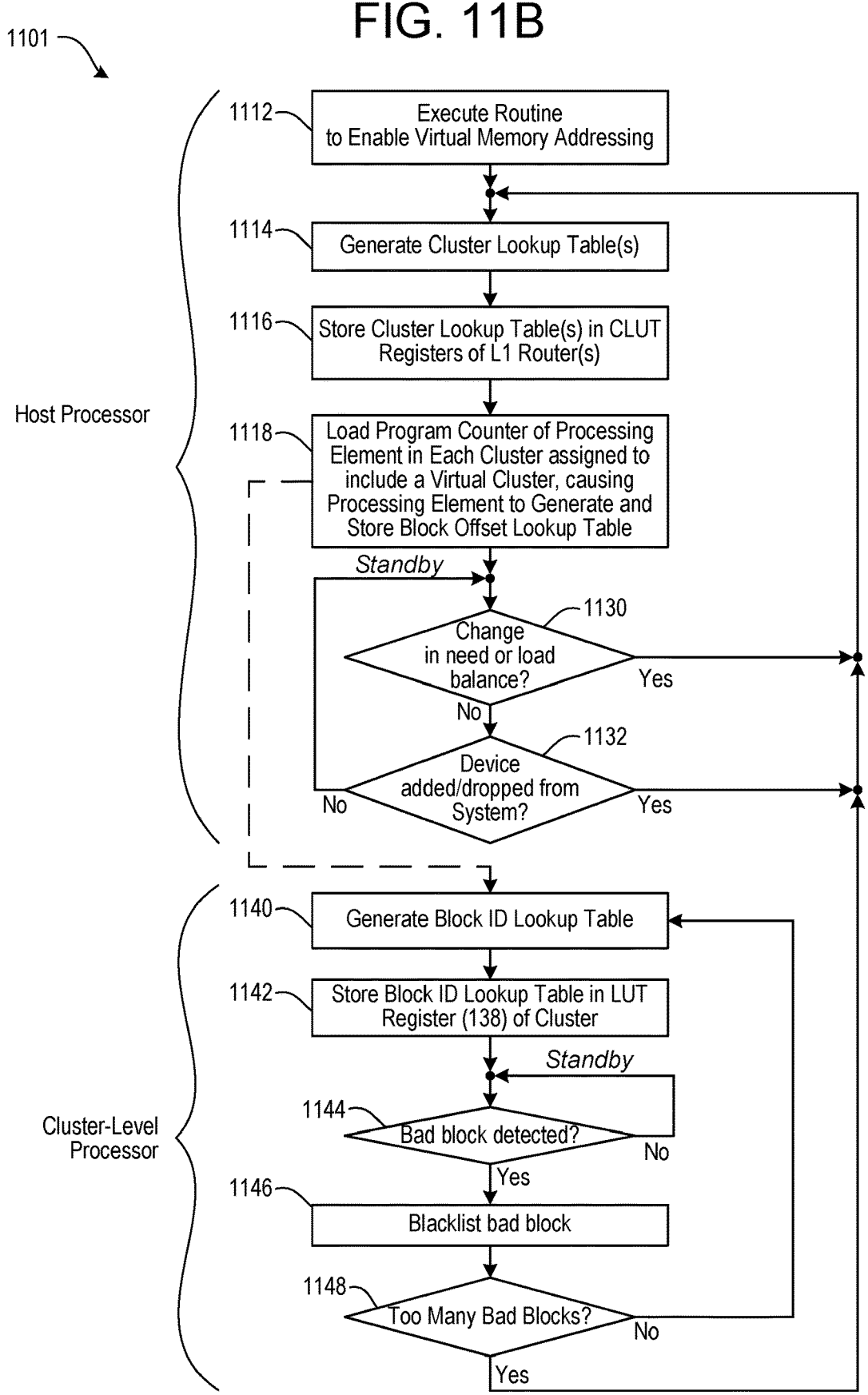

FIGS. 11A and 11B illustrates examples of the host processes 1100 and 1101 used to generate and store the lookup tables. In FIG. 11A, a "host" processor (e.g., a processing element 134, a supervisor 110, a dedicated system management processor, etc.) is configured to executed the host process 1100 (e.g., as or by a startup routine). The host processor executes (1112) a software or firmware routine to enable virtual memory addressing within the system. The processor may configure multiple chips 100. The host processor generates (1114) cluster lookup tables and stores (1116) the tables in the CLUT registers 108 of the L1 routers 102 on chips/devices 100 that contain clusters that will be used for virtual clusters 140.

Whether the same CLUT table is distributed to all the L1 routers 102 or different tables are distributed may depend, among other things, on the overall topology of the system. For example, if the same arrangement of virtual clusters will be used on four chips 100, the host processor configuring the virtual address space may individually send or multi-cast the same table to the four L1 routers 102. When tables are updated (e.g., due to a cluster memory being removed from the virtual space), the routine may selectively overwrite only the tables of L1 routers 102 that contain cluster memories 136 that are being added or removed from the virtual space.

The routine may also generate (1124) the block ID lookup tables and store (1126) the tables in the LUT registers 138 within the clusters 130. When identical tables are to be stored, they may be distributed individually or using multi-casting. When the routine needs to make changes the LUT tables 138 (e.g., to reallocate memory to avoid bad blocks), the routine may selectively send new tables only to the effected clusters 130.

After the tables are written, the host processor may suspend executing the host process 1100 and undertake other operations. However, the host processor may be configured to resume executing the host process in response to certain events, which may be communicated to the host processor (among other ways) by writing to one or more special purpose registers, causing the host process to be reload into the host processor's instruction pipeline, or into the instruction pipeline of another processing element that is available.

Software processes executed in the system may include explicit instructions to cause the host processor to a reconfigure the virtual memory space based on changes memory needs. Also, load-balancing software executed within the system may monitor network traffic to determine whether the virtual clusters 140 being accessed by processing elements 134 are proximate to the processing elements (e.g., based on latency of packets to a virtual cluster 140 exceeding a threshold value), and share the load balancing information with the host process so that when the host processor reconfigures the virtual address space, virtual clusters can be relocated to be physically closer to the processing elements 134 using them (e.g., in terms of "hops" between the processing elements 134 and the physical cluster memories corresponding hosting the virtual clusters 140, where a hop corresponds to a transit through a router). In FIG. 11A, the host process determines (1130) whether it needs to reconfigure the virtual address space based on an indication that there is a change in memory needs or that there is an imbalance in usage load. In response to determining (1130 "Yes") that there is a change in memory needs or a load imbalance, the host process 1100 may generate (1114) one or more new cluster lookup tables.

The host process may also be configured to determine (1132) when a chip/device 100 is added or dropped from the system. In response to determining (1132 "Yes") that a chip or device 100 has been added to or dropped from the system, the host process 1100 may generate (1114) one or more new cluster lookup tables.

The host process may also be configured to determine (1144) when a bad block has been detected within a virtual cluster 140. Components within the system (e.g., routers and processing elements) may be configured to send an error reporting packet to an address that causes the routine to reload/resume. For example, if a bad bit is detected (1144 "Yes") in a block used by a virtual cluster 140, the host process 1100 may blacklist (1146) the physical block containing the bad bit and generate (1114) one or more new cluster lookup tables to modify the tables to stop using bad block.

The host process 1100 may make these determinations (1130, 1132, 1144) in a variety of ways, such as by an active determination by the host process (e.g., monitoring system operations or polling registers or memory locations configured to store metrics updated by other processes), or in response to being triggered by another process (e.g., via the other process setting a flag in a special purpose register configured to serve as a host processor interrupt).

FIG. 11B illustrates a distributed process 1101 variant of the process in FIG. 11A, where some operations are handled by the host processor and some are handled at the cluster level. In the process 1101 in FIG. 11B, the host processor (e.g., a processing element 134, a supervisor 110, a dedicated system management processor, etc.) in the system executes steps 1112 to 1116 as discussed with FIG. 11A. However, instead of centrally determining all of the cluster-level lookup tables, the host processor load (1118) the program counter of a processing element 134 in each cluster 130 assigned to provide a virtual cluster 140 with the address of a firmware or software program. Upon execution, the program causes the processing element to generate (1140) and store (1142) the block ID lookup tables in the LUT registers 138 of that cluster 130. Parameters may be passed by the host process to the cluster level processor indicating, among other things, how many blocks should the cluster-level processing element 134 should allocate to the virtual address space. As discussed with FIG. 11A, the host process in FIG. 11B continues to determine (1130) whether there is a change in memory needs and to determine (1132) whether a device/chip 100 has been added or dropped from the system.

When a bad bit is detected (1144) in the virtual cluster 140 within that cluster 130, the bad block is blacklisted (1146). The error generation causes (e.g., using a processor interrupt) the program to reload and/or restart on a processing element 134 within the cluster 130. A determination (1148) is made as to whether the number of bad blocks within the cluster memory 136 exceeds a threshold value. If there are too many bad blocks (1148 "Yes"), the error is report to the centralized host processor so that the chip level tables 108 can be revised to remove the cluster memory 136 of the reporting cluster 130 from the virtual addressing space, or reduce the number of blocks that the reporting cluster is instructed to allocate to the virtual addressing space. If the number of bad blocks is below the threshold value (1148 "No"), the program running on the processing element 134 within the cluster 130 generates (1140) and stores (1142) a new block ID lookup table to remove the bad block from the virtual cluster 140.

An advantage of this distributed table management approach is that an individual cluster can locally fix routine problems (e.g., finding a bad bit) without the need to disrupt system operations. In such situations, the effects on system operations may be limited to the L2 router 132 creating back-pressure on packets directed to the cluster memory 136 while the virtual cluster 140 is reconfigured.

The processes in FIGS. 11A and 11B may both be used in a same system. For example, when virtual addressing is first enabled, the process 1100 in FIG. 11A may configure the system (e.g., using multicast packets to store identical tables in multiple L1 routers 102, and/or store identical tables in multiple L2 routers 132). Error-related interrupts (e.g., bad block detection) may cause the execution of the cluster-level portion of the process 1101 in FIG. 11B, with the centralized host processor portions of the process 1101 being invoked if a problem is too large for the cluster 130 to fix on its own (e.g., too many bad blocks).

Figure 12:
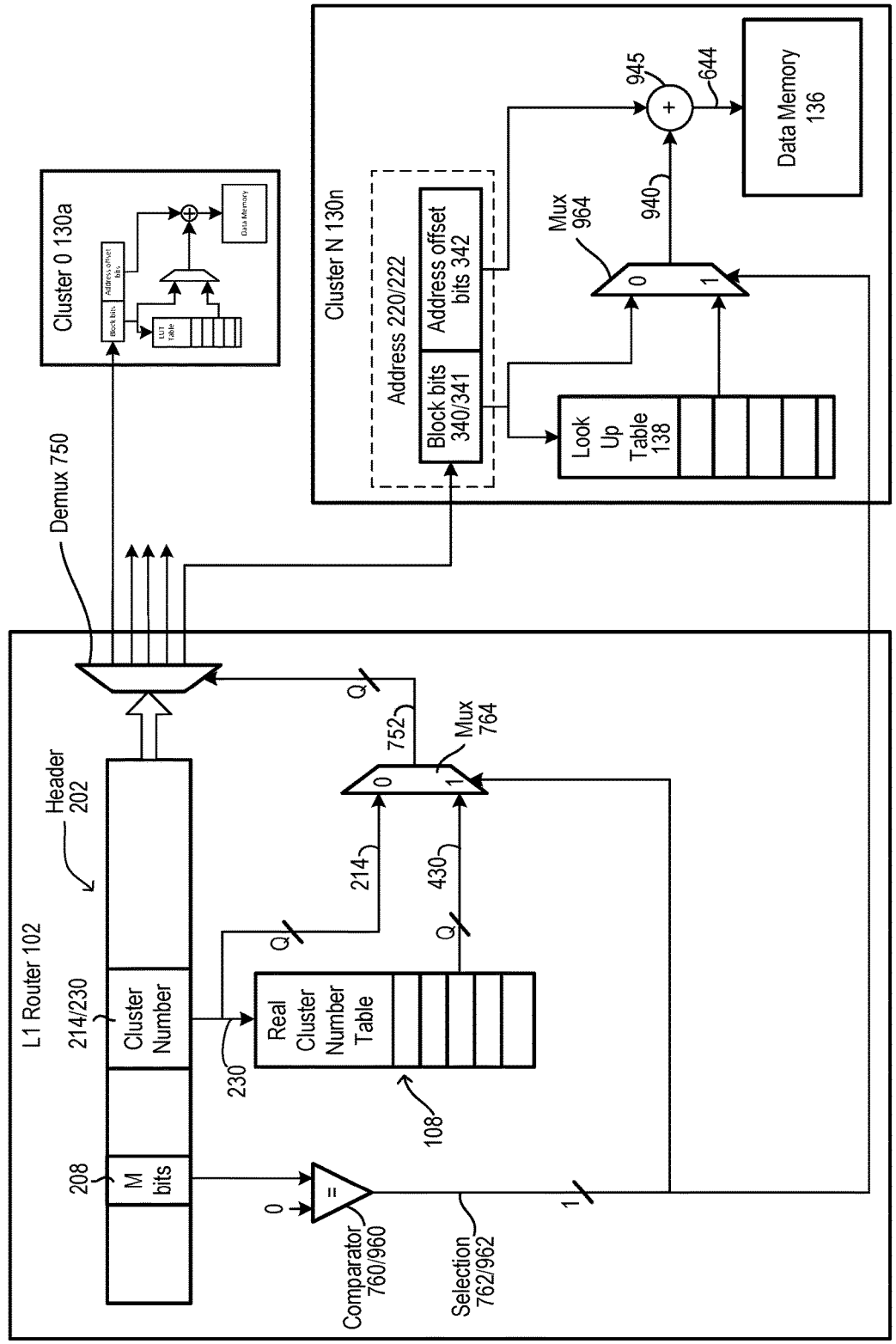
FIG. 12 is a block diagram overview of example components used for virtualization in the architecture of FIG. 1.

FIG. 12 is a block diagram overview of example components used for virtualization in the architecture of FIG. 1. The features in FIG. 12 are based on those discussed in connection with FIGS. 1 to 10. Ancillary components such as the bit-field extractors 756 and 958 are omitted in FIG. 12 to simplify the overview. Also to simplify the overview, a single comparator 760/960 is illustrated, but as illustrated in FIG. 9, each L2 router 132 will have its own comparator 960 to determine whether the M-bits 208 indicates that virtual addressing is in use.

Figure 13:
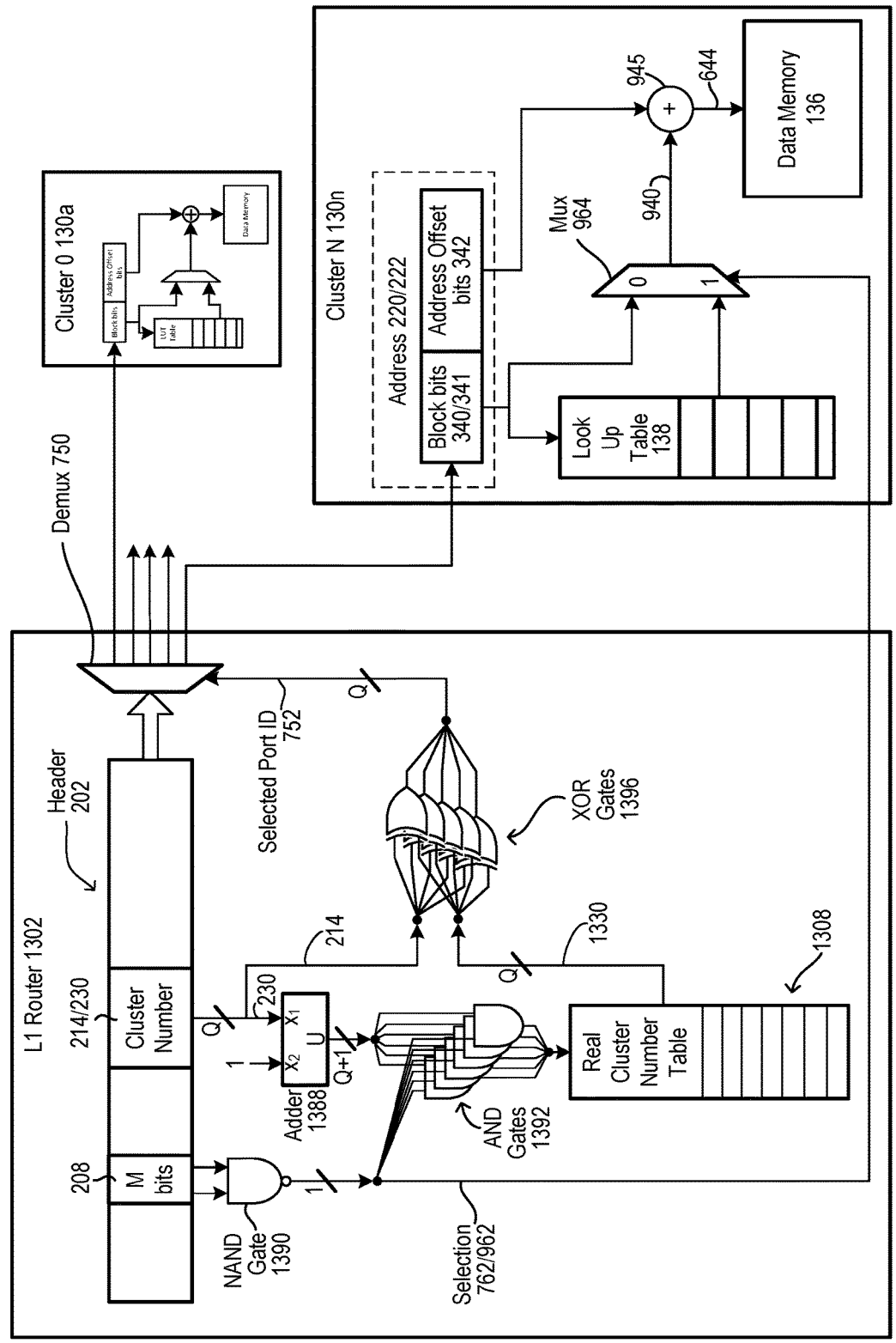
FIG. 13 is a block diagram overview of including alternative components used for virtualization in the architecture of FIG. 1.

FIG. 13 is a block diagram overview of including alternative components used for virtualization in the architecture of FIG. 1. The comparator(s) 760/960 are each replaced with a NAND gate 1390 to determine whether virtual addressing is being used, as indicated by the M-bits 208 being zero (0). So long as M=0 is used to indicate use of virtual addressing, the digital comparators 760/960 and the NAND gate(s) 1390 are interchangeable. The use of a NAND gate 1390 to generate the selection signals 762/962 in FIG. 13 demonstrates that various logic circuits can be used to generate the selection signals 762/962, tailored to assert the selection signals 762/962 if the header indicates that virtual addressing is in use. The use of M=0 to indicate virtualization is a design choice, and different values may be used to indicate virtualization. Likewise, if a "V" bit was included in the header to indicate that virtual addressing is used, and a value of zero (V=0) indicates that an address is virtual, then the selection signals 762/962 could be generated by inputting the extracted value of the V bit into an inverter, with the output of the inverter serving as the selection signal 762/962. If a "V" bit was included and a value of one (V=1) indicates that an address is virtual, the value of the bit as-extracted could be used to provide the selection signals 762/962.

In terms of the physical space required, the multiplexer 764 in FIG. 12 is relatively large in terms of gate count. FIG. 13 illustrates an alternative approach to determining the selected port ID 752. One extra entry is added in the virtual to physical addressing table (real cluster number table 1308). In the first entry (address 0), a fixed value of zero (0) is added. Each of the other entries from the table 108 is moved up by one "spot" in table 1308 (i.e., the entry for virtual cluster 0 is in address 1, the entry for virtual cluster 1 in address 2, and so on). However, the non-zero entries in the table 1308 do not hold the actual real physical address. Instead, each is filled with a bitwise exclusive OR of the virtual address and the physical address.

As shown in FIG. 13, translation of a virtual cluster number 230 start by doing a logical NAND of the M-bits 208 to produce the selection signal 762. As previously described, the selection signal 762 is asserted in response to a header 202 indicating that a packet is using virtual addressing. This produces a one (1) if M=0, and otherwise produces a zero (0).

The extracted cluster number 214/230 is incremented by one. This may be accomplished, among other ways, by adding one (1) to the value of the extracted cluster number 214/230 (e.g., using an adder 1388). If the entire range of "Q" bits is used to designate clusters (e.g., 5 bits are used to designate 32 clusters), then the incremented cluster number 214/230 may require Q+1 bits to express.

The selection signal is then logically ANDed (on a bitwise basis) with the incremented cluster number. In FIG. 13, this operation is illustrated by the Q+1 AND gates 1392. A first input of each AND gate 1392 receives the selection signal 762. A second input of each AND gate receives one bit of the incremented cluster number. The outputs of the AND gates 1392 serve as the register address used to read the table 1308.

So, for example, if M=0 (indicating virtual addressing), the outputs of the AND gates 1392 will correspond to the virtual cluster number 230 incremented by one (1). The incremented virtual cluster number 230 is used to look up an entry in the translation table 1308. The entry is equal to a logical XOR of the virtual and physical cluster number addresses. A bitwise XOR is then performed on the output from the table 1308 with the virtual cluster number address 230 from the input packet, which produces a physical cluster number address (((A XOR B) XOR A) ==((A XOR A) XOR B)==0 XOR B==B). This physical cluster number address serves as the selected port ID 752, which is input to the demultiplexer 750 to choose the real cluster to which the L1 router 102 directs the packet.

If, however, the M-bits 208 do not indicate virtual addressing (e.g., M not equal to zero (0)), the selection signal 762 is not asserted (i.e., the output of the NAND gate 1390 equals logic zero (0)) and the L1 router 102 will use physical addressing. The selection signal 762 is again input into the AND gates 1392, along with the bitwise real cluster number 214 incremented by one. not asserted, then the output from the NAND will be 0. Since zero (0) ANDed with anything is zero (0), the output of the AND gates 1392 will be an address of zero. This results in the first entry of the translation table 1308 being read, which as noted above, contains a value of zero (0). That value of zero goes to the XOR gates 1396. The XOR gates XOR the input (already physical) cluster number 214 with 0 (which does not change the cluster number 214: A XOR 0 =A. This result output by XOR gates 1396 serves as the selected port ID 752, which is input to the demultiplexer 750 to choose the real cluster to which the L1 router 102 directs the packet.

When the M-bits 208 (or V bit, if used) indicate that virtual addressing is used, the selection signal 762 is asserted and the XOR-based routing circuit produces the real cluster number 430 corresponding to the virtual cluster number 230. When the selection signal 762 is not asserted, the XOR-based routing circuit produces the physical cluster number 214 as extracted from the header 202.

The advantage of this XOR-based approach is fairly simple: potentially, there is a reduction in gate count in comparison to the multiplexer-based approach in FIG. 12, since multiplexers tend to be fairly large in terms of the space used on the semiconductor substrate. If there is a relatively small number of clusters, the difference between the multiplexer-based approach in FIG. 12 and the XOR-based approach in FIG. 13 may be small (in terms of overall gate count). However, as the number of clusters increases, the number of bits required to designate the cluster number increases, increasing the size and complexity of the multiplexer, such that the XOR-based approach may have advantages on some chips.

In FIG. 13, although the same multiplexer-based approach is used as the cluster level as was used in FIG. 12, an XOR-based approach may also be used by the L2 routers 132 in the clusters 130. To implement an XOR-based solution at the cluster level, the look-up table registers are configured to store an exclusive OR of each virtual block ID 340 with the corresponding real block base address 540, using XOR gates to determine the real block base address 540 in the same manner that the XOR gates 1396 in FIG. 13 are used to determine the port ID 752.

A chip/device 100 may mix multiplexer-based and XOR-based virtual address resolution, or use the same approach at both the L1 and L2 router levels. Examples of mixed approaches include using an XOR-based solution in the L1 router 102 and a multiplexer-based solution in the L2 routers 132 (as illustrated in FIG. 13), and using a multiplexer-based solution in the L1 router 102 and an XOR-based solution in the L2 routers 132 (not illustrated).

Figure 14A:
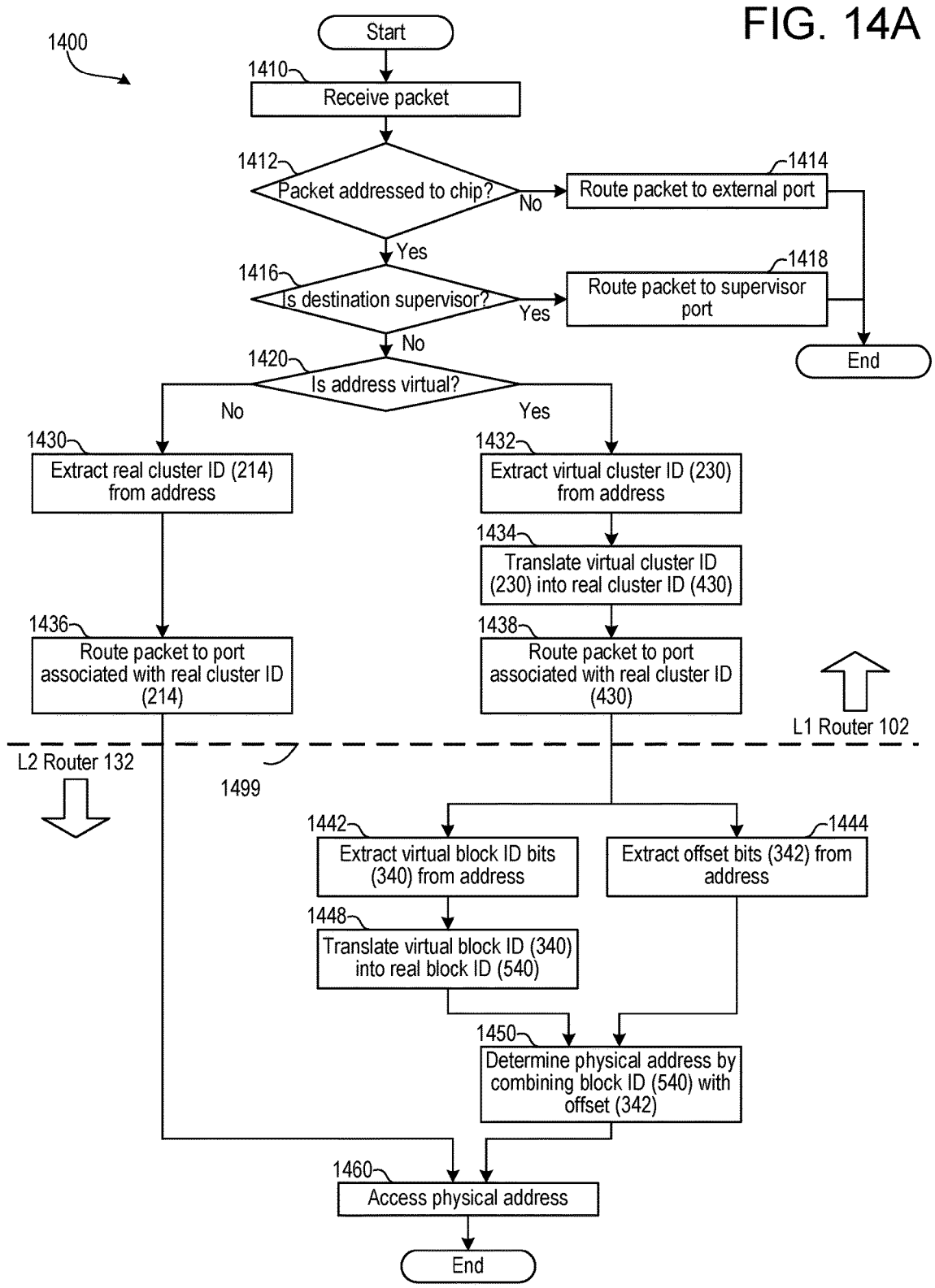
FIGS. 14A and 14B are examples of routing processes performed by the architecture in FIG. 1.
Figure 14B:
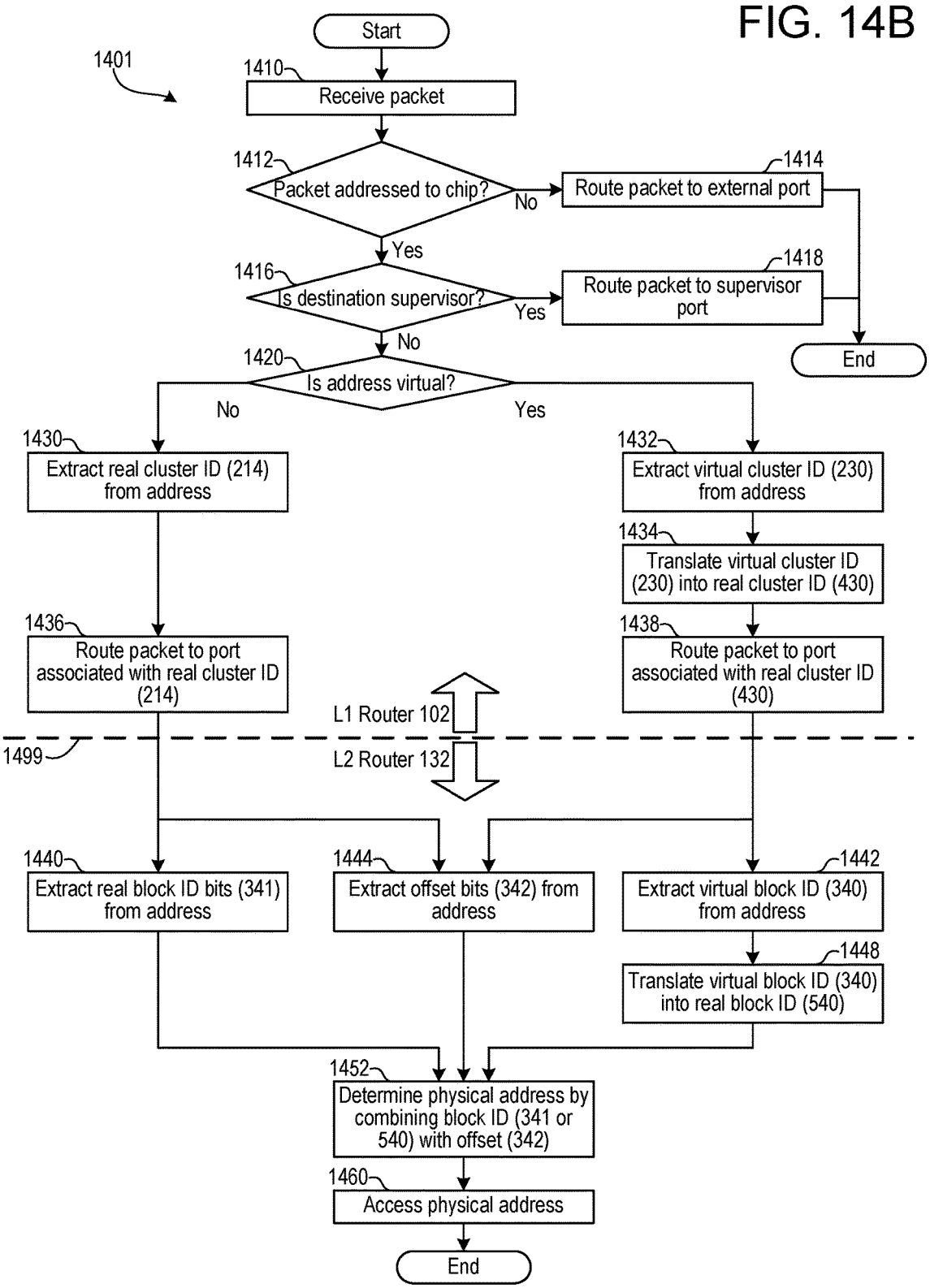

FIGS. 14A and 14B are examples of routing processes performed by the architecture in FIG. 1. In FIGS. 14A and 14B, a dotted line 1499 delineates operations performed by the L1 router 102 (above line 1499) and operations performed by the L2 routers 132 (below line 1499).

In the process 1400 in FIG. 14A, the process begins with the L1 router 102 receiving (1410) a packet. A determination (1412) is made as to whether the packet is addressed to the chip/device containing the L1 router 102 (e.g., based on the device ID 212 in the packet header 202). If the packet is not addressed to the chip/device (1412 "No"), then the packet is routed (1414) to an external port 103 and transmitted out of the chip/device. Otherwise (1412 "No"), a determination (1416) is made as to whether the packet is addressed to the supervisor processor 110 of the chip/device (e.g., based on the M-bits 208 indicating M=1). If the packet is addressed to the supervisor, then the packet is routed (1418) to the supervisor via the supervisor port 109.

Otherwise (1416 "No"), by process of elimination, the packet is destined for one of the clusters 130. A determination (1420/802) as to whether the address contained in the header is virtual (e.g., based on the M-bits or V-bit). If the address is physical (1420/802 "No"), the real cluster ID 214 is extracted (1430) from the address, and the packet is routed (1436) to the internal port 111 associated with the real cluster ID 214. The L2 router 132 receives the packet at the cluster 130, and accesses (1460) the physical address (either directly or indirectly through an intermediate component receiving the address from the L2 router 132).

If the address is virtual (1420/802 "Yes"), the virtual cluster ID 230 is extracted (1432) from the address, and the virtual cluster ID 230 is translated (1434/804) into a real cluster ID 430. The packet is routed (1438) to the internal port 111 associated with the real cluster ID 430. The L2 router 132 receives the packet at the cluster 130 and extracts (1442) the virtual block ID bits 340 and extracts (1444) the offset bits from the header address. The L2 router 132 translates (1448/1004) the extracted virtual block ID 340 into a real block ID 540. The L2 router determines (1450) the physical address by combining the block ID 540 with the offset 342, and accesses (1460) the physical address.

In the process 1401 in FIG. 14B, the processes performed by the L1 router 102 (those above line 1499) are the same as in FIG. 14A. However, in additional detail is included in the L2 router 132. If the address is real (1420 "No"), the L2 router 132 extracts (1440) the real block ID bits 341 and the offset bits 342 from the address. The L2 router 132 determines the physical address by combining the extracted offset bits 342 with the real block ID 341 or the real block ID 540, depending upon whether or not the address is physical or virtual. The combined physical address is then accessed (1460).

While it has not been addressed in the illustrations, if the packet address 210 is a physical processing element-level address 210d (M=3), the L1 router 102 will route the packet to the cluster in the same manner as a physical cluster-level address 210c (M=2). In comparison, the L2 router may route the packet directly to the destination processing element 134 if the M-bits indicate a physical processing element-level address 210d (M=3), bypassing the packet interface processor 137.

Figure 15:
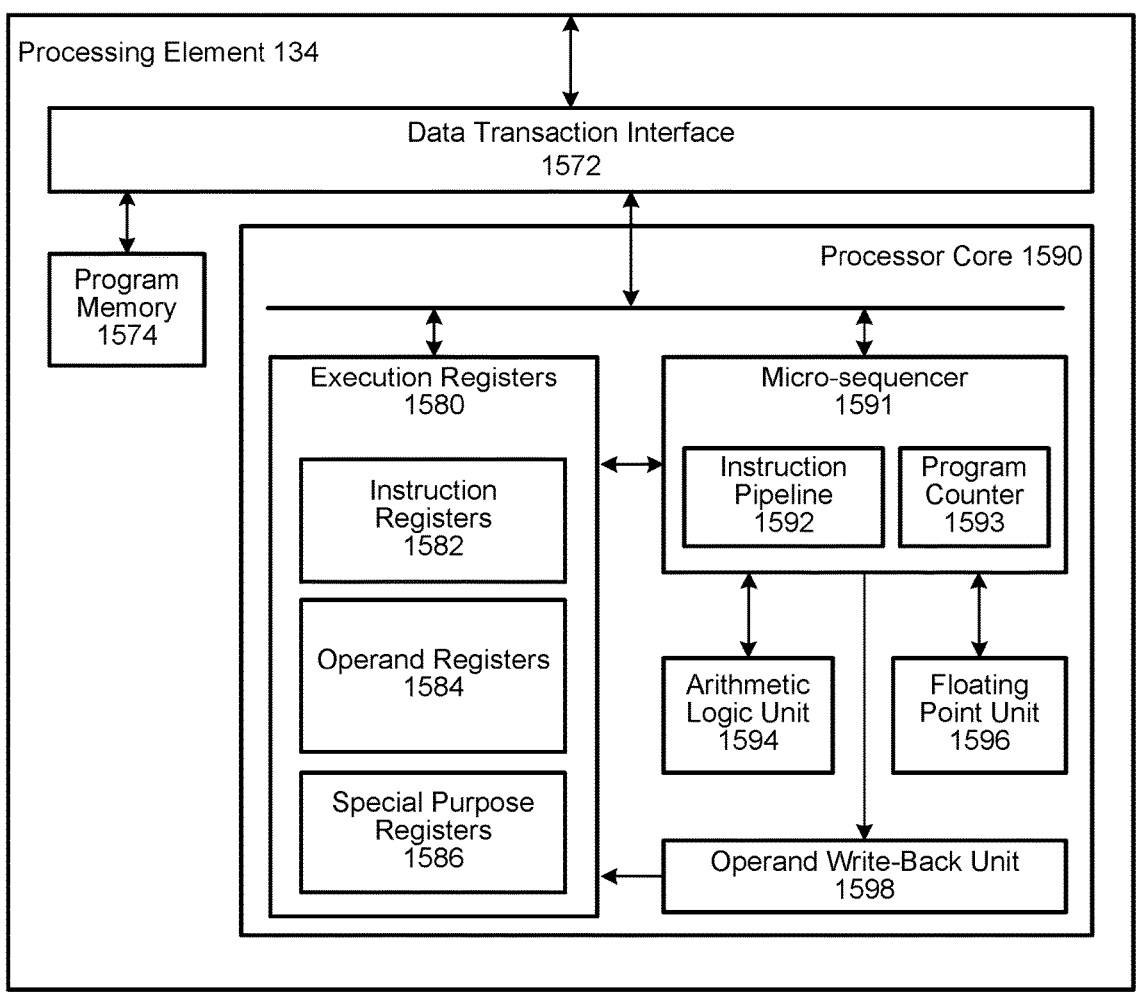
FIG. 15 is a block diagram conceptually illustrating example components of a processing element of the architecture in FIG. 1.

FIG. 15 is a block diagram conceptually illustrating example components of a processing element of the architecture in FIG. 1. A data transaction interface 1572 sends and receives packets and connects the processor core 1590 to its associated program memory 1574. The processor core 1590 may be of a conventional "pipelined" design, and may be coupled to sub-processors such as an arithmetic logic unit 1594 and a floating point unit 1596. The processor core 1590 includes a plurality of execution registers 1580 that are used by the core 1590 to perform operations. The registers 1580 may include, for example, instruction registers 1582, operand registers 1584, and various special purpose registers 1586. These registers 1580 are ordinarily for the exclusive use of the core 1590 for the execution of operations. Instructions and data are loaded into the execution registers 1580 to "feed" an instruction pipeline 1592. While a processor core 1590 may experience no latency (or a latency of one-or-two cycles of the clock controlling timing of a micro-sequencer 1591) when accessing its own execution registers 1580, accessing memory that is external to the core 1590 may produce a larger latency due to (among other things) the physical distance between the core 1590 and the memory.

The instruction registers 1582 store instructions loaded into the core that are being/will be executed by an instruction pipeline 1592. The operand registers 1584 store data that has been loaded into the core 1590 that is to be processed by an executed instruction. The operand registers 1584 also receive the results of operations executed by the core 1590 via an operand write-back unit 1598. The special purpose registers 1586 may be used for various "administrative" functions, such as being set to indicate divide-by-zero errors, to increment or decrement transaction counters, to indicate core interrupt "events," etc.

The instruction fetch circuitry of a micro-sequencer 1591 fetches a stream of instructions for execution by the instruction pipeline 1592 in accordance with an address generated by a program counter 1593. The micro-sequencer 1591 may, for example, may fetch an instruction every "clock" cycle, where the clock is a signal that controls the timing of operations by the micro-sequencers 1591 and the instruction pipelines 1592 within a cluster 130. The instruction pipeline 1592 comprises a plurality of "stages," such as an instruction decode stage, an operand fetch stage, an instruction execute stage, and an operand write-back stage. Each stage corresponds to circuitry.

In addition to the black listing of blocks discovered during chip operations, the cluster memories 136 may be tested at the time of manufacture, and bad bits/blocks either masked out or stored to be added to the blacklist(s) used to generate the tables. A chip may maintain a blacklist for all cluster memories on the chip (e.g., in nonvolatile memory at the L1 router level), and/or clusters may maintain a blacklist its own cluster memory. The centralized host processor that manages CLUT tables 108 may poll the chips/clusters for blacklist data, and maintain a master list that contains information spanning across multiple chips.

Although the examples include chunks 142 containing an integer number of blocks, a system could be configured to contain partial blocks within a virtual cluster. Due to the way addressing works, this would produce gaps in the virtual address space, where the non-existent portion of a block would have to be masked out.

As described above, virtual addressing allows internal and external processors access to memory and processing without any knowledge of device IDs, chip architecture, or packet routing. Among the advantages of the system are the removal of the physical clusters from the virtual address space, the bypassing of bad clusters to increase chip yield and reliability, rapid dataflow and virtual space remapping, heterogeneous memory mapping, and reduced overhead. The reduction of overhead includes a reduction (or elimination of) the latency associated with the used of page tables, the large amount of space required for page tables that map the entire virtual address space, and a reduction of bus traffic associated with virtual address resolution.

Another advantage is the elimination of table translation caching. The page tables normally occupy enough storage that they need to be stored in main memory. Heavily used parts of the page tables are then cached in a "translation lookaside buffer," typically using some variant of least-recently used replacement. This typically occupies a substantial amount of chip area, and depending on data usage patterns can still be relatively slow, as references to memory require loading different page table entries. For example, to minimize the need to map large amounts of contiguous memory from graphics adapters, most current processors also include support of multiple sizes of pages—normal pages of a few kilobytes (typically 4K or 8K) and large pages of a few megabytes. In recent iterations, still larger pages a few hundred megabytes or perhaps a gigabyte or so may be used for paging. Dealing with these multiple sizes further increases the complexity of circuitry for page translation.

The design, by contrast, provides high speed access to memory regardless of memory access patterns, because all the data needed for address translation is stored within the multi-processor chip 100 itself, eliminating the need for table caching. In addition to being simpler to maintain and update, the virtual address translation tables 108 and 138 are significantly smaller than conventional page tables, making the use of localized high-speed registers (e.g., SRAM-based registers) to store the tables practical, in comparison to the slower but physically smaller dynamic random access memory (DRAM) conventionally needed to store page tables.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, microprocessor design, and network architectures should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
   receiving, by a first device, data comprising a first address;
   extracting a first virtual address bits from the first address;
   translating the first virtual address bits into first physical address bits, comprising:
      accessing a register storing a first value equal to a bitwise exclusive OR of the first virtual address bits and the first physical address bits, the register having a register address based on the first virtual address bits; and
      performing a bitwise exclusive OR of the first value with the first virtual address bits to obtain the first physical address bits;
   routing the data to a first port of a plurality of ports based on the first physical address bits, wherein the first port is associated with a first physical memory of a plurality of separate physical memories;
   extracting second virtual address bits and address offset bits from the first address, as received via the first port;
   translating the second virtual address bits into second physical address bits;
   combining the second physical address bits and the address offset bits to determine a first physical address within the first physical memory; and
   reading from or writing to the first physical address.

2. The method of claim 1 wherein translating the first virtual address bits further comprises:
   incrementing the first virtual address bits to produce incremented virtual address bits,
   wherein the register address of the register comprises the incremented virtual address bits.

3. The method of claim 1, wherein translating the second virtual address bits comprises:
   accessing a register storing a value equal to a bitwise exclusive OR of the second virtual address bits and the second physical address bits, the register having a register address based on the second virtual address bits; and
   performing a bitwise exclusive OR of the value with the second virtual address bits to obtain the first physical address bits.

4. The method of claim 1, wherein the data comprises a header indicating use of either virtual addressing or a physical addressing, the method further comprising:
   determining from the header of the data that the first address is a virtual address.

5. The method of claim 1, wherein:
   the second virtual address bits identify a virtual block of memory in a virtual memory space, and
   the second physical address bits identify a physical block of the first physical memory.

6. The method of claim 1, wherein each of the plurality of separate physical memories is associated with a different clusters of processors, each cluster of processors being accessible via a same port of the plurality of ports as the associated physical memory.

7. The method of claim 1, further comprising:
   storing a first lookup table in a first plurality of registers, the first plurality of registers comprising a first register, wherein the translating of the first virtual address bits into the first physical address bits is based on a first value of the first lookup table stored in the first register; and storing a second lookup table in a second plurality of registers, the second plurality of registers comprising a second register, wherein the translating of the second virtual address bits into the second physical address bits is based on a second value of the second lookup table stored in the second register.

8. The method of claim 7, further comprising:
sending the second lookup table via the first port to be stored in the second plurality of registers.

9. The method of claim 7, wherein the second virtual address bits identify a virtual block of memory in a virtual memory space, and the second physical address bits identify a first physical block of the first physical memory, the method further comprising:
determining that the first physical block comprises one or more bad bits; and
revising one or both of the first lookup table and the second lookup table to reassociate the virtual block with a second physical block that is different than the first physical block.

10. The method of claim 7, wherein the first device is one of a plurality of devices in a system, each device comprising a respective plurality of separate physical memories, the method further comprising:
determining that a second device has been added to or removed from the plurality of devices, that software executed in the system has new memory needs, or that there is an imbalance in transactions between the plurality of devices using virtual addresses; and
revising one or both of the first lookup table and the second lookup table.

11. The method of claim 1, further comprising:
determining that the first address is an address within the first device.

12. A semiconductor chip, comprising:
a first router;
a plurality of separate physical memories each associated with a different port of a plurality of ports of the first router, including a first physical memory associated with a first port;
a second router associated with the first port; and
a digital comparator or gate logic circuit that receives one or more bits from a header of the data packet and outputs a selection signal indicating whether the first address is a virtual address or physical address based on the one or more bits,
wherein the first router is configured to:
receive a data packet comprising a first address,
extract a first virtual address bits from the first address,
translate the first virtual address bits into first physical address bits based on a first lookup table, and
transmit the data packet via the first port based on the first physical address bits; and
wherein the second router is configured to:
receive the data packet via the first port,
extract second virtual address bits and address offset bits from the first address,
translate the second virtual address bits into second physical address bits based on a second lookup table, and
combine the second physical address bits and the address offset bits to determine a first physical address within the first physical memory.

13. The semiconductor chip of claim 12, wherein the first router is configured to translate the first virtual address bits by accessing a first register of a first plurality of registers, the first plurality of registers storing the first lookup table, and the first register have a register address based on the first virtual address bits,
the first router comprising:
a multiplexer configured to output the first physical address bits based on the first address being a virtual address; and
a demultiplexer having a plurality of outputs, each output corresponding to one of the plurality of ports), wherein the demultiplexer is configured to select one of the plurality of ports using the first physical address bits.

14. The semiconductor chip of claim 12, wherein the second router is configured to translate the second virtual address bits by accessing a first register of a second plurality of registers, the second plurality of registers storing the second lookup table, and the first register having a register address based on the second virtual address bits.

15. The semiconductor chip of claim 12, the first router further comprising:
a plurality XOR logic gates that receive the first virtual address bits and perform a bitwise exclusive OR of the first virtual address bits and another value to obtain the first physical address bits.

16. The semiconductor chip of claim 12, further comprising a plurality of processors configured into a plurality of clusters, each cluster associated with a different port of the plurality of ports and including a different physical memory of the plurality of separate physical memories,
the second router further configured to route data received from the first router via the first port to processors in the cluster associated with the first port.

17. A device comprising:
means for receiving data comprising an address;
means for extracting first virtual address bits from the address by:
accessing a register storing a first value equal to a bitwise exclusive OR of the first virtual address bits and the first physical address bits, the register having a register address based on the first virtual address bits; and
performing a bitwise exclusive OR of the first value with the first virtual address bits to obtain the first physical address bits;
means for translating the first virtual address bits into first physical address bits;
means for routing the data to a first port of a plurality of ports;
means for extracting second virtual address bits and address offset bits from the address;
means for translating the second virtual address bits into second physical address bits; and
means for determining a physical address in a physical memory using the second physical address bits and the address offset bits.

* * * * *